Figure 1:
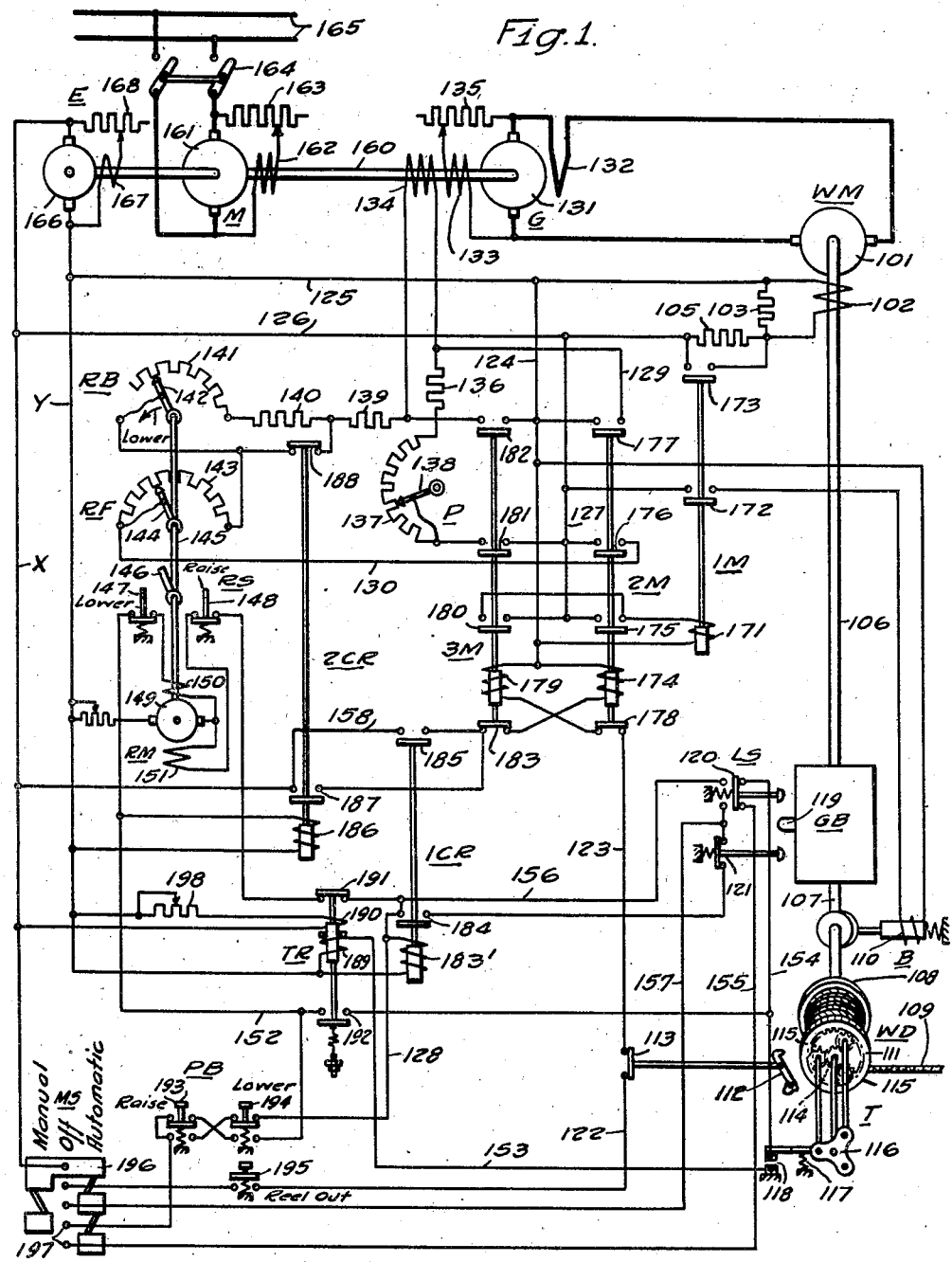

Jan. 21, 1947. K. MAHNKE 2,414,473
CONTROL SYSTEM FOR WINCH DRIVES
Filed Nov. 20, 1943 3 Sheets-Sheet 1

WITNESSES:
E. A. McCloskey
Curt M. Avery

INVENTOR
Kurt Mahnke.
BY
Paul E. Friedemann
ATTORNEY

Jan. 21, 1947.                  K. MAHNKE                    2,414,473
                        CONTROL SYSTEM FOR WINCH DRIVES
                          Filed Nov. 20, 1943        3 Sheets-Sheet 2

WITNESSES:
E. A. M'Closkey
Curt M. Avery

INVENTOR
Kurt Mahnke.
BY Paul E. Friedemann
ATTORNEY

Jan. 21, 1947.    K. MAHNKE    2,414,473
CONTROL SYSTEM FOR WINCH DRIVES
Filed Nov. 20, 1943    3 Sheets-Sheet 3

INVENTOR
Kurt Mahnke
BY
Paul E. Friedemann
ATTORNEY

Patented Jan. 21, 1947

2,414,473

UNITED STATES PATENT OFFICE 2,414,473

CONTROL SYSTEM FOR WINCH DRIVES

Kurt Mahnke, Forest Hills, Pa., assignor to Westinghouse Electric Corporation, East Pittsburgh, Pa., a corporation of Pennsylvania Application November 20, 1943, Serial No. 511,038

11 Claims. (Cl. 254—172)

My invention relates to control systems for winch drives, in particular towing winches.

It is known to provide towing machines with variable voltage drives of the Ward-Leonard type and to control a rheostat in the field circuit of the generator, serving to supply variable voltage to the winch motor, in dependence upon the rotation of the hawser drum driven by the motor. This control arrangement is so designed that the torque of the winch motor is progressively increased when the drum, under excessive cable pull, is forced to pay-out, and is progressively decreased when the motor torque exceeds the cable pull and causes the drum to heave in. As a result, the paid-out length of cable is automatically kept within desired limits. It is also known in such systems to control the field excitation of the generator by means of a tension-responsive device with the effect of reducing the torque of the winch motor when the tension or pull of the towing cable becomes too high.

It is an object of my invention to improve variable voltage drives of the above-mentioned type so as to afford a more versatile control, adjustability and maneuverability of the towing or other winch operation. More in particular, the invention aims at providing a control system which, while permitting an automatic, variable torque operation according to the above-mentioned principle of the known machines, can also be caused to reduce or increase the datum torque of the winch motor under load and under control by the operator, thereby affording a much greater flexibility of control as obtained in the control systems heretofore available. It is also intended by this invention to achieve such torque adjustments by means of simple electric switch or push button controls.

Another object of my invention is to provide a variable voltage drive for towing machines, containing variable torque control means of the manual or automatic type above-referred to, with separate control means for paying out or heaving in under no-load or light-load conditions and at a torque and speed setting different from that of the towing operation proper in order to obtain optimum working conditions in either case of control.

It is also an object of the invention to devise a variable voltage system of winch control in which the resistance of the generator field circuit is automatically varied when heaving in and paying out, respectively, so as to reduce and increase the torque of the winch motor to such an extent that the effect of the winch friction on the operation of the winch drive is practically eliminated.

Figure 4:
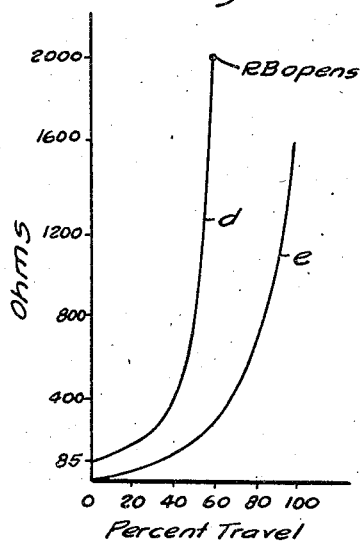
Figure 5:
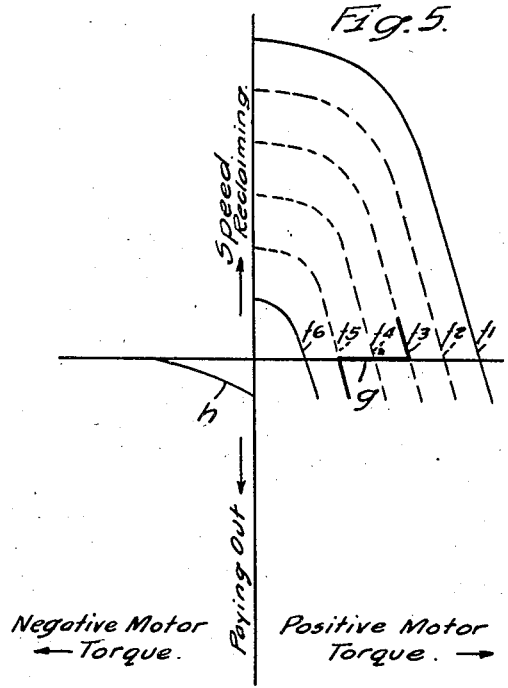
Figure 6:
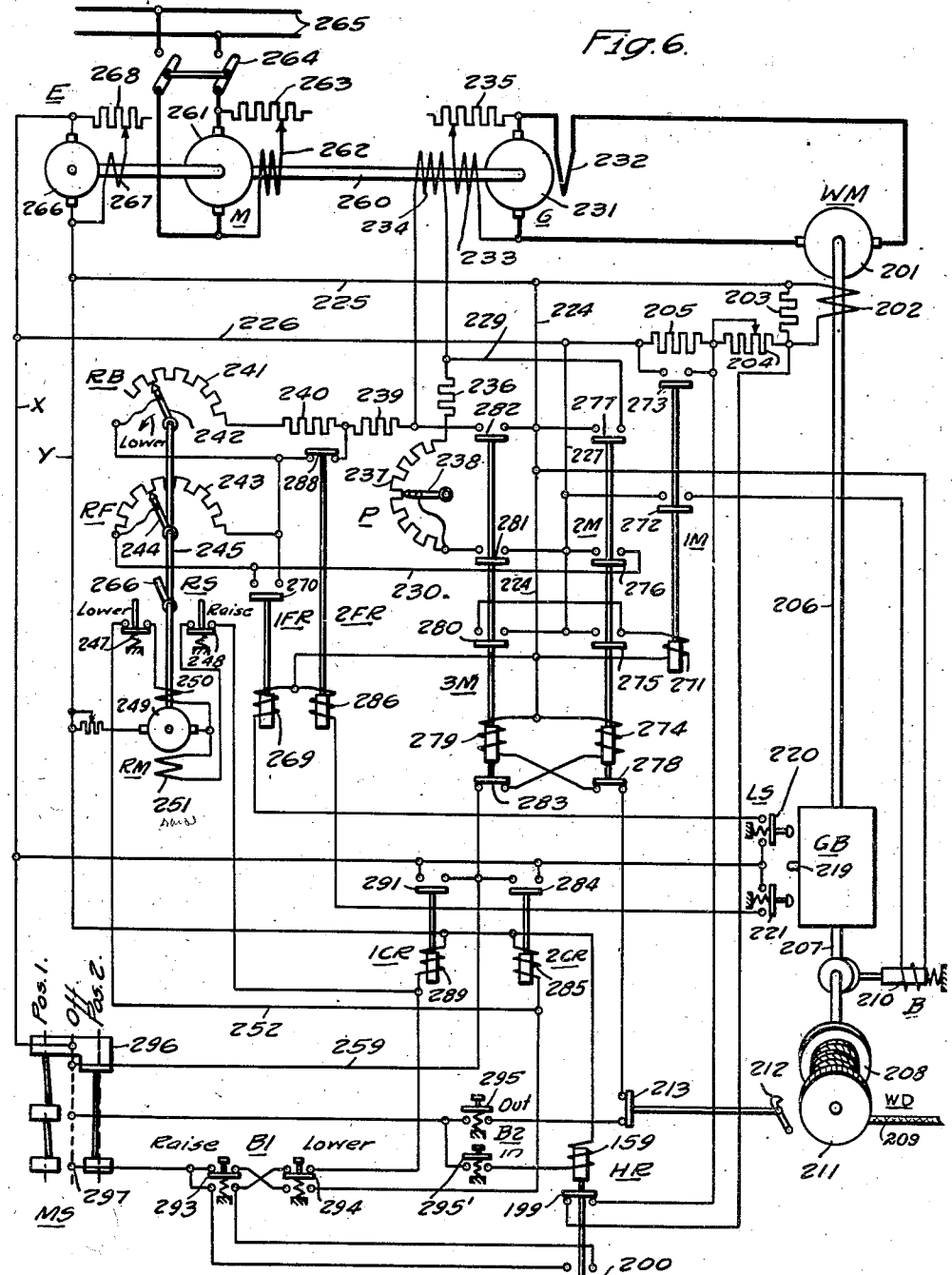

These and other objects will become apparent from the following description of the embodiments shown in the drawings, in which:

Figure 1 represents a circuit diagram of a complete winch control system in accordance with the invention, while Figs. 2, 3, 4 and 5 exemplify operating characteristics relating to the same system; and Fig. 6 is a circuit diagram of another winch control system also in accordance with my invention.

Referring to Fig. 1, the winch motor is denoted by WM. It is shafted to a gear-box GB containing a speed-reduction gear for driving the winch drum WD. A brake B is provided acting on the winch drum or its shaft. This brake is spring operated and electrically releasable. A tensiometric device T is associated with the winch drum for producing a control impulse on the winch motor when the rope tension exceeds a given limit. The motor WM is controlled by a generator G which, in turn, is driven by a constant-speed motor M serving also to drive an exciter generator E for supplying direct current of constant voltage to its output mains X and Y from which the generator and motor field windings are energized under control of a master switch MS and a set of push buttons PB and also under control by the above-mentioned tensiometer T and a set of limit switches LS which are actuated in dependence upon the length of rope paid out by the drum WD.

More in detail, the winch motor WM has its armature 101 acted upon by a separately excited field winding 102 which is shunted by a discharge resistor 103 of high resistance and energized through leads 125 and 126 from the exciter mains X and Y through a resistor 105 controlled by a relay IM. The armature 101 is mounted on the input shaft 106 of the gear-box GB. The output shaft 107, revolving at reduced speed, is connected with the drum body 108 of the winch drum WD containing the hawser (towing cable or rope) 109. The magnet coil for releasing the spring-actuated brake B is denoted by 110. It is also controlled by the above-mentioned relay IM. One end disc 111 of the winch drum is provided with ratchet teeth for cooperation with a pawl 112 which, when engaging the ratchet wheel, prevents paying out of the rope 109 and controls a contact 113 which is closed only when the ratchet pawl 112 is disengaged. The ratchet wheel 111 forms also the orbit gear of a planetary drive whose sun gear 114 is rigidly mounted on the drum shaft 107. The planetary gears 115 of the drive mesh with the orbit gear and the sun gear and are journaled on shafts which are mounted on the spider 116 of the tensiometer T. This spider is rotatable about the drum shaft 107 and is biased for counterclockwise rotation by a spring 117. A control contact 118 is connected with the spider so as to be closed when the spider rotates in counterclockwise direction against the force of spring 117. Such rotation occurs only when the pull of rope 109 acting on the drum gear 111 exceeds a safe limit corresponding to the setting of spring 117. The closure of the tensiometer contact 118 passes a control impulse into the control system tending to change the torque of the winch motor WM towards reducing the cable pull, as will be apparent from the following.

The gear-box GB is provided with a traveling nut which causes a cam 119 to travel in the upward or downward direction depending upon the direction of rotation of the shafts 106 and 107. The limit switch LS has two contacts 120 and 121. Contact 120 is actuated when cam 119 travels in the upward direction beyond an adjusted limit position which corresponds to the desired length of rope paid out by the winch drum. Contact 121 is actuated when the traveling cam 119 moves downwardly beyond an adjusted position corresponding to the minimum rope length paid out by the drum. The operation of the two contacts has also the effect of changing the torque of the winch motor WM towards reestablishing the desired rope length between the adjusted maximum and minimum limits, as will also become apparent hereinafter.

The armature 101 of the winch motor WM is series connected with the armature 131 of the main generator G. A generator field winding 132 serving as an interpole and compensating winding is also arranged in the armature circuit. The generator G has a self-excited shunt winding 133 and a separately excited shunt winding 134 acting cumulatively on the armature 131. The excitation of winding 133 is not changed during the operation of the control system, but can be adjusted by means of a rheostat 135. The excitation of the separately excited field winding 134 is controlled by a field circuit which contains a fixed resistor 136 and a resistor 137 of a manually adjustable potentiometer P whose slider is denoted by 138. This field circuit includes further two fixed resistors 139 and 140 and two series connected rheostats RB and RF. Numeral 141 denotes the resistor, and 142 the slider of rheostat RB, while the resistor and slider of rheostat RF are designated by numerals 143 and 144, respectively. The two sliders 142 and 144 are mounted on a common shaft 145 which carries also the actuating arm 146 of a set of rheostat limit switches RS comprising a contact 147, which is opened when arm 146 reaches one end position, and a contact 148 to be opened by arm 146 when it reaches its other limit position. The armature 149 of an auxiliary rheostat motor RM is connected with the shaft 145 and contains two field windings 150 and 151. Winding 150 is wound for rotating the armature 149 in the direction indicated by an arrow marked "lower." When the rheostats are actuated in this direction, while their branch of the generator field circuit is rendered operative by the relay means to be described presently, the main generator G is caused to reduce its output voltage, thereby lowering the torque of the winch motor WM. When the rheostat motor RM is energized by its field winding 151, its rotation is in the opposite direction, so that the rheostats RB and RF are caused to increase the field excitation of the main generator G, thus increasing the torque of the winch motor WM. The armature 131 of the main generator G is mounted on a shaft 160 which is driven by the armature 161 of the constant-speed motor M and carries also the armature 166 of the excited generator E. The drive motor M has a shunt field 162 whose excitation can be adjusted by means of a rheostat 163. A main switch 164 connects the motor M to a suitable current source denoted by 165. The exciter E has a self-excited shunt field 167 whose excitation is adjusted by a rheostat 168 which permits varying the direct-current voltage impressed on the exciter mains X and Y. During the normal operation of the system, the setting of rheostats 163 and 168 need not be changed.

The above-mentioned relay 1M for controlling the brake B and the series resistor 105 in the motor field circuit has a control winding 171 which, when energized, closes the relay contacts 172 and 173. Two relays denoted by 2M and 3M are provided for controlling the connection of the above-mentioned potentiometer P and the rheostats RB and RF with the field winding 134 of the main generator G. The relay 2M has a winding 174 which, when energized, closes the contacts 175, 176 and 177 of the relay while opening a back contact 178. Similarly, relay 3M has a control coil 179 whose energization causes the contacts 180, 181 and 182 to close and back contact 183 to open. The circuit of coil 174 extends over the back contact 183 of relay 3M, and the circuit of coil 179 extends over the back contact of relay 2M. In this manner, the two relays are electrically interlocked so that when relay 2M is energized and its back contact opened, the relay 3M remains inoperative and vice versa. Consequently, only one of the two branches of the generator field circuit, that is, either the manually adjusted potentiometer P or the motor-driven rheostats RB and RF, can be operative at a time. In order to obtain this result, the relays 2M and 3M may also be provided with a mechanical interlock, preferably in addition to the above-mentioned electric interlock.

The coil circuit of relay 2M extending through the back contact 183 of relay 3M is controlled by two relays by 1CR and 2CR. Relay 1CR has a control coil 183' which, when energized, closes the contacts 184 and 185. The coil 186 of relay 2CR actuates a normally open contact 187 and a normally closed contact 188, the latter serving to short-circuit the rheostat RB and the fixed field resistor 140 as long as coil 186 remains deenergized.

A timing relay denoted by TR has a main control coil 189 and a compensating coil 190 and contains two contacts 191 and 192 under control by the main coil 189. The compensating coil 190 serves merely to provide a definite time limit, but is incapable of actuating the relay contacts without simultaneous energization of the main coil 189. The excitation of the compensating winding is derived from the exciter mains X and Y and can be adjusted to a desired time limit value by means of a potentiometer 193 whose adjustment is not changed during the operation of the control system. A short-circuiting winding may be provided in relay TR in order to obtain an increased timing period. A time limit of three to five seconds, for instance, is sufficient.

The set of push buttons PB includes a "raise" button 193 which when actuated serves to energize the auxiliary motor RM to run in the torque raising direction, and a "lower" button 194 for controlling the auxiliary motor to run in the torque lowering direction indicated by the arrow. A third push button 195 is provided for causing the winch motor WM to pay out at relatively high speed under no-load or light-load conditions. The push buttons are only operative when the master switch MS is in the "manual" position, but are ineffective in the "off" and "automatic" positions of switch MS. On the other hand, the contacts 120 and 121 of the pay-out limit switch LS are only connected to the exciter mains when the master switch is in the "automatic" position. The master switch is of the drum controller type; its contact segments are denoted by 196, and the appertaining contact fingers by 197. The control system includes also a number of interconnecting conductors which will be referred to in the following description of the operation of the system.

In order to place the control system in operative condition, the main switch 164 is to be closed. This starts the drive motor M and causes the exciter E to supply its mains X and Y with constant voltage. The shunt field 102 of the winch motor WM is energized, but the field is weakened by the series resistor 105. The compensating winding 190 of the timing relay TR is energized and places the relay in receptive condition without actuating its contacts. Assuming that the master switch MS is in the "off" position, the generator shunt field 134 remains deenergized because the relays 2M and 3M are deenergized. Since contact 172 of relay 1M remains open, the spring of brake B is effective; that is, the brake is set and the motor WM and drum WD remain stopped.

*MS in "manual" position*

When now the master switch is placed into "manual" position, the winch drive is under control of the push buttons PB. These buttons function in the following manner: Pressing the reel-out button 195 will energize the relay 3M, if the ratchet pawl 112 is disengaged and the contact 113 closed as shown in the drawings. The energizing circuit for relay 3M extends over the elements X, MS, 195, 122, 113, 123, 178, coil 179 of 3M, 124, 125, Y. Relay 3M closes its contacts 180, 181 and 182 while opening the interlocking back contact 183, thus rendering relay 2M ineffective. Due to the closure of contacts 181 and 182, the field circuit of the generator winding 134 is energized through the potentiometer P, the closed field circuit extending through the elements X, 126, 127, 181, resistor 137 of P, 136, 134, 182, 124, 125, Y. As a result, the winch motor WM is energized by the generator G to run in the pay-out direction with a speed and torque characteristic as set by the reel-out potentiometer P. The closure of contact 180 energizes the coil 171 of the brake relay 1M which, in turn, releases the brake B by closing contact 172 and places full voltage on the motor shunt field 102 by closing contact 173. These conditions prevail as long as the reel-out button 195 is kept depressed. When the button is released, the motor WM is stopped and the brake B set. Hence the operation of button 195 permits paying out any desired length of rope.

When the "raise" button 193 is pressed, the relay 1CR is energized through circuit X, MS, 193, 194, 128, coil 183' of 1CR, Y. At the same time, the rheostat motor RM is energized through X, MS, 193, 194, 128, 191, 148, field coil 151 of RM, 149, Y. Relay 1CR energizes the contactor 2M through X, 185, 183, coil 174 of 2M, 124, 125, Y. Contactor 2M energizes the generator field winding 134 through circuit Y, 125, 124, 177, 129, 134, 139, 188, resistor 143 of rheostat RF, 130, 176, 127, 126, X, and the rheostat RF driven by motor RM increases progressively the excitation of the generator and hence the torque of the winch motor WM. Contact 175 of relay 2M also energizes coil 171 of the brake relay 1M, which releases the brake B by closing contact 172 and imposes full excitation on the field winding 102 of the winch motor by closing contact 173. As a result, the winch motor will pull in the rope under increasing torque until the "raise" button 193 is released.

When the "lower" button 194 is actuated, the relay 2CR becomes effective through the circuit X, MS, 193, 194, 152, coil 186 of 2CR, Y. The rheostat motor RM is now connected with its "lowering" field winding 150 in the circuit Y, 149, 150, 147, 152, 194, 193, MS, X and reduces the generator excitation. The contact 188 of 2CR opens and inserts additional resistance 140 and 141 into the generator field circuit for reducing the motor torque to a further extent. Relay 2M comes in through X, 187, 183, 174, 124, 125, Y, while relay 3M is interlocked by the opening of contact 178 and stays deenergized. Hence the manually adjusted potentiometer P is now ineffective. The closure of contact 175 in relay 2M energizes the coil 171 of relay 1M through Y, 124, 174, 175, 127, 126, X. Relay 1M closes contact 172, thereby releasing the brake B, while contact 173 puts full voltage on the motor field. The winch motor WM is now again caused to pull in the rope, but with a decreasing torque due to the action of RB and RF.

When during the actuation of either button 193 or 194, the motor standstill torque corresponding to the then prevailing excitation of the generator G is exceeded by the torque exerted on the motor shaft by the pull of the towing rope 109, the motor is forced to reverse its direction, and rope will be paid out. During the actuation of the push button 193 or 194, the rheostat motor RM will be in operation only as long as the arm 146 of the rheostat shaft 145 remains within the maximum and minimum limit positions. Upon passing beyond either position, the limit switch RS will automatically stop the further motion of the rheostat motor.

In the above-described manner, the push button set PB permits a manual control of all steps required for the performance of a towing operation. The rope can be paid out or pulled in to any extent, and the torque of the motor can be elastically regulated so as to satisfy any occurring towing conditions.

*MS in "automatic" position*

With the master switch MS set for "automatic" control, the winch drive is governed by the operation of the tensiometer T and the limit switch LS. As long as the traveling cam 119 of the limit switch LS is somewhere between the maximum and minimum contacts 120 and 121, the winch motor remains deenergized and the brake B set.

When the tension in the towing rope 109 increases to such an extent that the tensiometer contact 118 closes, the control coil 189 of the timing relay TR is energized through circuit Y, 189, 153, 118, 154, contact 120 of LS, 155, MS, X. The subsequent closure of the time relay contact 192 energizes relay 2CR through Y, 186, 152, 192, 154, 120, 155, MS, X, and the rheostat motor RM through circuit Y, 149, 150, 147, 152, 192, 154, 120, 155, MS, X. Relay 2 CR brings in 2M through X, 187, 183, coil 174 of 2M, 124, 125, Y. Relay 2M interlocks 3M at 178 and energizes the generator field by closing contacts 176 and 177. The generator field winding 134 is now energized through rheostats RB and RF by a circuit X, 126, 127, 176, 130, 143 of RF, 141 of RB, 140, 139, 134, 129, 177, 124, 125, Y. That is, the field excitation of the main generator is supplied through both rheostats RF and RB in series connection so that the field is progressively weakened due to the operation of motor RM. Contact 175 of relay 2M energizes coil 171 of 1M, and thereby releases the brake at 172 and puts full voltage on the motor at 173.

If permitted to turn that far, the rheostat motor RM will increase the weakening field resistance until the rheostat RB opens the field circuit by moving the slider 142 in the "lowering" direction beyond the extent of the resistor 141. Before this happens, however, the tensiometer contact 118 will have opened so that the timing relay TR drops out a few seconds later, stopping the rheostat motor RM by opening its circuit at 192 and stopping also the winch motor WM by deenergizing relay 2CR due to the opening of its coil circuit at 192.

If the rope pull again increases until the tensiometer contact 118 closes, the preceding operation is repeated. The torque of the winch motor WM may now have been lowered and the rope been paid out until the limit switch LS actuates its contact 120. This contact trips the timing relay TR by opening the above-described energizing circuit of relay coil 189. The subsequent opening of contact 192 of TR opens the circuit of coil 186 of 2CR, and stops the rheostat motor RM which was running in the "lowering" direction or had stopped due to the operation of the rheostat limit switch LS. The actuation of contact 120 of LS energizes relay 1CR through circuit Y, coil 183' of 1CR, 156, 120, 157, MS, X. Relay 1CR seals itself in with contact 184 and energizes 2M by closing at 185 the circuit for coil 174 of 2M extending through X, 158, 185, 183, 174, 124, 125, Y. Contact 175 of 2M energizes coil 171 of 1M which, in turn, releases the brake and puts full excitation on the field of the winch motor. The rheostat motor RM is now energized to run in the "raising" direction by the completion of circuit Y, 149, 151, 148, 191, 156, 120, 157, MS, X, and the rheostats RF and RB are turned accordingly. This operation continues until either the minimum pay-out limit switch 121 opens, which stops the motors WM and RM and sets the brake B, or—provided the maximum pay-out contact 120 has closed again—the tensiometer T again causes the motor torque to be lowered. In the latter case, relay 1CR may remain energized by its sealed-in contact, but the opening of contact 191 of TR, due to the energization of coil 189 upon the closure of tensiometer contact 118, will interrupt the "raise" circuit of the rheostat motor.

As apparent from the foregoing, when the tension of the rope becomes too large while heaving in, the motor will reverse its direction of rotation in order to pay-out with the motor torque remaining in the original, heave-in direction. In view of this change in rotating direction without directional change in torque, the considerable amount of frictional losses in winch drives of this type must be taken into consideration. These losses may amount up to 30% or even more of the entire power consumption. The friction has to be overcome by the motor when heaving in, and by the hawser when paying out. If the motor torque remained constant during its change of running direction, the hawser pull would have to increase considerably, for instance to more than twice its value for a frictional loss of 30%, in order to make the motor reverse its direction for paying-out operation. Hence, to maintain the same pull, the motor torque has to be lowered considerably, for instance to about one-half of its heave-in value. The above-described use of a generator shunt field regulated by the rheostats RF and RB affords a control of the motor torque in the just-mentioned manner. For instance, when the tensiometer contact 118 closes, both rheostats RF and RB are inserted in the field circuit of generator winding 134. This cuts the motor torque back to the required pay-out value so that the effect of the winch friction is practically eliminated.

The diagrams of Figs. 2 through 5 serve to further elucidate these operating conditions by way of example, referring to a winch drive designed in accordance with the circuit diagram of Fig. 1.

Figure 2:
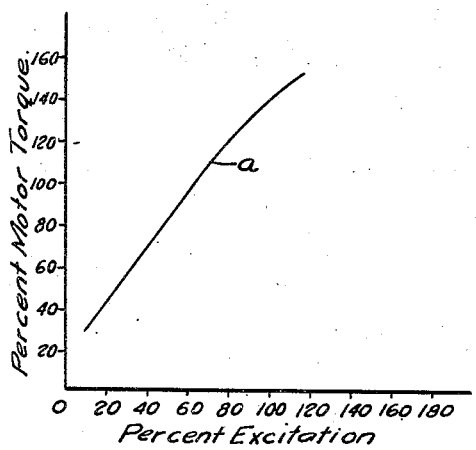

In Fig. 2, the torque conditions of a winch motor (WM in Fig. 1) are represented by curve $a$ in dependence upon the percentile excitation of the separately excited generator shunt field (134 in Fig. 1).

It will be seen from curve $a$ that under the exemplified operating conditions, a reduction in the separate generator excitation by approximately 34% of the normal value reduces the motor torque by about 40% of its normal value.

Figure 3:
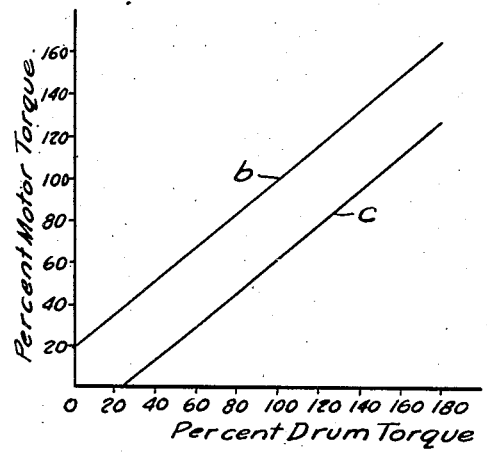

The diagram of Fig. 3 shows in curves $b$ and $c$ the relation of the motor torque to the drum torque in percentile values with reference to the same conditions as assumed in the diagram of Fig. 1. Curve $b$ represents the conditions prevailing when the winch motor heaves in while overcoming also the winch friction, this friction being assumed as a constant friction torque of 20% of the full load motor torque. Curve $c$ represents the case of operation in which the rope pull overcomes the motor torque as well as the friction in the winch, thereby causing the drum to pay out. A reduction in the motor torque of about 40% is required to shift the characteristic from curve $b$ to curve $c$ when reversing the motor operation from heaving in to paying out according to this diagram. This change in torque is obtained by the above-described control of the motor-driven rheostats RB and RF whose operating characteristics are represented in Fig. 4.

Referring to Fig. 4, the ordinate of the diagram represents the resistance values of the rheostats RB and RF in ohms while the abscissa represents the amount of travel of the rheostat sliders expressed in percent of the full available travel distance. Curve $d$ relates to rheostat RB, and curve $e$ to rheostat RF.

The diagram shown in Fig. 5 simplifies diagrammatically the results obtained with a system according to Fig. 1 under the conditions illustrated by the diagrams of Figs. 2, 3, and 4. The curves $f1$ through $f6$ represent speed torque diagrams of the winch motor, the portion above the abscissa referring to the positive or heave-in direction of rotation of the drum and winch motor, while the lower portion of the diagram relates to the negative or pay-out direction of rotation. The characteristic $f1$ prevails at "automatic" or "manual" operation when the motor-driven rheostats are adjusted for maximum torque, and the characteristic $f6$ is effective when the rheostats are adjusted for minimum torque. Hence, during the progressive operation of the automatic rheostat adjustment, the effective characteristic shifts from curve $f1$ towards $f6$ or vice versa, passing through the intermediate characteristics denoted by $f2$ through $f5$. When a change in direction occurs, the motor torque is varied automatically, due to the action of the tensiometer contact 118, for instance, by 40% in accordance with the diagram of Fig. 3, this shift being indicated by way of example in curve $g$. The characteristic denoted by curve $h$ exemplifies the conditions obtaining during the operation of the manual reel-out button 195.

The embodiment shown in Fig. 6 differs from the above-described system in providing an automatic control governed merely by a pay-out limit switch, i. e. without employing a tensiometric control device. Furthermore, an additional push-button control is provided for affording a high-speed reel-in operation at the will of the operator. The system of Fig. 6 is also different as regards the operation and energization of the winch motor and brake during a towing operation. Despite these differences, however, the system of Fig. 6 is, in many essential details, similar to the one described in the foregoing. In order to facilitate a comparison, the reference characters WM, G, M and E are applied to Fig. 6 in the same manner as to Fig. 1. Likewise, the reference characters GB, LS, WD, RB, RF, RS, RM, P and MS used in Fig. 6 denote machinery and apparatus similar to those designated by the same reference characters in Fig. 1. The last two digits of the reference numerals applied to Fig. 6 are identical with the corresponding digits of the numerals in Fig. 1 wherever functionally comparable elements are concerned.

The interconnection and cooperative relation of the winch motor WM to the gear-box GB, the brake B and the hawser drum WD as well as the circuit connections of the winch motor with the cam generator G and the connection of the latter with the drive motor M, likewise the inter-relation of rheostats RB and RF to the auxiliary motor RM, are identical with those in the preceding embodiment. The other details of the system according to Fig. 6 will be fully understood from the following description of its operation.

With the master switch MS in the "off" position, the closure of the main switch 264 starts the auxiliary motor M and causes the exciter E to put voltage on the exciter mains X and Y. The shunt field 202 of winch motor WM is energized from X and Y through resistors 205 and 204 which weaken the motor field. The generator field winding 234 remains deenergized because its circuit is open at contacts 276, 271 of relay 2M and at contacts 281, 282 of relay 3M. The brake B is set because contact 272 of relay 1M is open. The winch motor remains at rest.

*MS in position #1*

When the master switch MS is set in position #1, the winch drive is under control by push buttons B1 and B2, the brake B being set when none of the buttons is pressed and released upon operation of any button. Push buttons B1 (293, 294) serve to control the towing operation, and buttons B2 (295, 295') serve to heave in or pay out any desired length of rope within the available limits.

Pressing the reel-out button 295, when the ratchet pawl 212 is disengaged and hence contact 213 closed, will energize relay 3M through the circuit X, MS, 295, 213, 278, coil 279 of 3M, 224, 225, Y. Relay 3M, by closing contacts 281 and 282, supplies energizing current to the generator field winding 234 through Y, 225, 224, 282, 234, 236, resistance 237 of P, 281, 227, 226, X, while RB and RF remain disconnected from field winding 234 because contacts 276 and 277 of 2M remain open, 2M being inoperative due to the opening of interlock contact 283. The field energization of generator G is now dependent on the setting of manually adjustable potentiometer P. Contact 280 of 3M energizes coil 271 of 1M through Y, 226, 227, 280, 271, 224, 225, Y. Relay 1M closes 272 thereby releasing brake B, and also closes 273 thereby shorting resistor 205 so that the winch motor WM obtains full field voltage. The motor is energized to pay out rope until button 295 is released.

For reeling in with no (or little) towing load, button 295' is depressed. This energizes relay HR through X, MS, 295', coil 159 of HR, Y. Contact 199 of HR opens, thereby placing resistor 204 into the motor field circuit for increased motor speed. Contact 200 of HR closes also and establishes a circuit X, MS, 200, 294, coil 289 of 1CR, Y, and also a circuit from 294 through 248, 251, 249, Y. As a result, the rheostat motor RM starts running in the raising direction, and relay 1CR, by closing its contact 291, energizes relay 2M through circuit X, 291, 283, coil 274 of 2M, 224, 225, Y. This has the effect of energizing the generator field winding 234 through circuit Y, 225, 224, contact 277 of 2M, 229, 234, 239, 240, 241 and 242 of RB, 243 and 244 of RF, 230, contact 276 of 2M, 227, 226, X. Due to the operation of motor RM, the generator G is energized with increasing voltage. This, together with the reduced field energization of the winch motor WM, causes the latter to reel in at high speed.

The operation of buttons 295 and 295' thus permits paying in and out at will preparatory to a towing operating or reeling the rope in after completion of a tow. The buttons 293 and 294 are provided for controlling the rope length during a towing operation, i. e., under load, button 293 serving to obtain increasing torque or pull and hence a reduced rope length, and button 294 to obtain a reducing torque and hence a yieldingly increasing rope length under load. The function of these buttons, more in detail, is as follows.

Pressing reel-out button 295, when pawl 211 is disengaged and contact 213 closed, will energize relay 3M through circuit X, MS, 295, 213, 278, coil 279 of 3M, 224, 225, Y. Relay 3M energizes the generator shunt field 234 through circuit Y, 225, 224, contact 282 of 3M, 234, 236, 237 of P, 281 of 3M, 227, 226, X. The winch motor WM will pay out with a speed and torque characteristic as set by the manually adjusted potentiometer P. Contact 280 of 3M energizes coil 271 of relay 1M through X, 226, 227, 280, 271, 224, 225, Y. Relay 1M closes 272 and releases the brake B, and also closes 273 thereby placing full voltage on the motor shunt field 202 by short-circuiting resistor 205. If the button 295 is released, the motor WM will stop and the brake B again be set.

Pressing the "raise," button 293 will energize coil 289 of relay ICR by closing circuit X, MS, 293, 294, 289, Y. Relay ICR closes 291 and thereby energizes 2M through circuit X, 291, 283, coil 274 of 2M, 224, 225, Y. Interlock contact 278 opens and maintains 3M inoperative. Contacts 276 and 277 of 2M close the circuit of generator field winding 234 through Y, 225, 224, 277 of 2M, 229, 234, 239, 288, 243 of FR, 230, 276 of 2M, 227, 226, X. 275 of 2M closes the circuit of coil 271 of IM through Y, 225, 224, 271, 275, 227, 226, X. Relay IM puts full voltage on motor WM at 273 and releases the brake B at 272. The motor reclaims the rope until stopped by the release of button 293. During this operation, the rheostat motor RM is energized to run in the raising direction, through Y, 249, 251, 248, 294, 293, MS, X. Hence, RF is turned to reduce its resistance and to increase the generator field excitation.

Pressing the "lower," button 294 will energize relay 2CR through X, MS, 293, 294, coil 285 of 2CR, Y. At the same time, rheostat motor RM is energized to run in the lowering direction, through X, MS, 293, 294, 252, 247, 250, 249, Y, so that the generator excitation decreases. Relay 2CR closes contact 284 and thereby energizes 2M through X, 284, 283, coil 274 of 2M, 224, 225, Y. Relay 3M is locked by the opening of contact 278 of 2M. Contact 275 of 2M energizes coil 271 of IM which, at 272, releases the brake B and puts full voltage on the field winding 202 of the winch motor WM by shortening resistor 205 at 273. Contacts 276 and 277 of 2M close the energizing circuit of the generator shunt field winding 234 through Y, 225, 224, 277 of 2M, 229, 234, 239, 288, resistor 243 of RF, 230, contact 276 of 2M, 227, 226, X. Motor WM will again reclaim the rope but with decreasing torque due to the progressing reduction in generator field excitation caused by RF.

When holding either button 293 or 294 depressed to obtain the operation described in the foregoing, the motor WM will heave in only as long as its standstill torque, corresponding to the respective excitation of the generator, is not exceeded. Upon occurrence of an excessive pull, the motor is forced to reverse its direction and to pay out as much rope as is needed to reduce the pull. Furthermore, when during the above-described operation, controlled by either button 293 or 294, the rheostat RF reaches either end position, the respective contact 247 or 248 will be opened by arm 266 so that the circuit of motor RM is interrupted. Upon such interruption, the further operation of motor WM occurs without change in the generator excitation and hence at a constant torque. When paying out rope and reaching the maximum rope length for which the limit switch LS is set, the traveling cam 219 will close contact 220 thereby energizing relay IFR through X, 220, 269, 224, 225, Y. Relay IFR closes 270 and thus shorts RF so that the resistance in the circuit of the generator field winding 234 is reduced to its minimum as determined by resistor 239. Hence, the torque of WM is immediately increased to a maximum. Conversely, if the rope length reaches the minimum for which LS is set, the traveling nut 219 will close contact 221, thereby energizing 2FR, through X, 221, 286, 224, 225, Y. Contact 286 of 2FR opens and places the resistance of 240 and RB in the field circuit thereby reducing the torque of the winch motor WM in order to pay out rope until contact 221 of LS closes again.

*MS in position #2*

When MS is set in position #2, the B2 buttons 295 and 295' are disconnected so that relays HR and 3M cannot be energized. The winch is now under control only by the buttons BI and the limit switch LS. This position of the master switch is provided in order to prevent an inadvertent operation of the reel-out and high-speed reel-in buttons 295 and 295' after towing load has been placed on the rope. The length of rope is then controlled by the operation of the limit switch LS in accordance with the torque setting determined by the adjustment of the rheostat RF. This setting can be varied at will during the towing operation, i. e. under load, by operating the BI buttons as described in the foregoing. During this towing operation, relay 3M is permanently energized through circuit X, MS, 259, 283, coil 274 of 2M, 224, 225, Y, so that the circuit of the generator field winding 234 is closed at 276 and 277, placing RB and RF in operation, while the closure of contact 275 causes relay IM to place full voltage on the field winding 202 of the winch motor WM by shorting field resistor 205. At the same time, the brake B is released by closure of 272 and stays released during the entire towing operation, i. e. as long as MS is in position #2, so that the load is now taken up by the countertorque developed by the winch motor.

Since, as demonstrated by the above-described embodiment, various modifications of my invention are possible without departure from its essence, I wish this specification to be understood as illustrative and not in a limiting sense.

I claim as my invention:

1. A variable voltage winch control system comprising, in combination, a winch drum, a winch motor in mutually effective driving connection with said drum, a generator for providing energization for said winch motor and having a field winding for controlling said energization, two sets of resistance means for controlling the excitation of said field winding, selectively operable contactor means for connecting said field winding with said sets respectively, an auxiliary motor arranged in driving connection with one of said sets for varying the resistance value of said set in order to vary the torque of said motor accordingly, operator-controlled contact means for controlling said auxiliary motor to run in either direction for increasing and lowering said torque respectively, additional operator-controlled contact means for controlling said contactor means so as to connect said other set of resistance means with said field winding in order to cause said winch motor to run said drum in pay-out direction in accordance with the setting of said other resistance means.

2. A variable voltage control system for a towing winch comprising, in combination, a winch drum and a rope thereon, a winch motor in mutually effective driving connection with said drum, said motor having a separately excited field winding, a generator having an armature connected with said winch motor and a field winding for controlling the voltage of said motor, rheostat means connected with said generator field winding for controlling its excitation, an auxiliary motor disposed in driving connection with said rheostat means for varying their resistance adjustment in order to cause said generator to vary the torque of said winch motor, means for controlling said auxiliary motor to run in either direction for lowering and raising the torque of said winch motor respectively, and separate control means under control by the operator and connected with said motor field winding as well as with said auxiliary motor for reducing the motor field excitation while causing said auxiliary motor to run in torque raising direction when said separate control means are actuated in order to reclaim said rope at high speed.

3. A variable voltage control system for a towing winch comprising, in combination, a winch drum for accommodating a towing rope, a winch motor in mutually effective driving connection with said drum, a generator having an armature connected with said winch motor and a field winding for controlling the voltage of said motor, rheostat means connected with said field winding for controlling its excitation, an auxiliary motor disposed in driving connection with said rheostat means for varying their resistance adjustment in order to cause said generator to vary the torque of said winch motor, manual contact means for controlling said auxiliary motor to run in either direction for lowering and raising the torque of said winch motor respectively, and a tensiometric device controlled by said drum and connected with said auxiliary motor for controlling it in dependence upon the tension in said rope.

4. A variable voltage control system for a towing winch comprising, in combination, a winch drum and a rope thereon, a winch motor in mutually effective driving connection with said drum, a generator having an armature connected with said winch motor and a field winding for controlling the voltage of said motor, rheostat means connected with said field winding for controlling its excitation, an auxiliary motor disposed in driving connection with said rheostat means for varying their resistance adjustment in order to cause said generator to vary the torque of said winch motor, manual contact means for controlling said auxiliary motor to run in either direction for lowering and raising the torque of said winch motor respectively, a tensiometric device controlled by said drum and having a contact actuated in response to the occurrence of a given maximum tension in said rope, a timing relay connected with said contact, said relay being connected with said auxiliary motor to control it so as to run in the torque lowering direction upon actuation of said contact.

5. A variable voltage winch drive comprising, in combination, a winch drum, a winch motor in mutually effective driving connection with said drum, a generator having an armature connected with said winch motor and a field winding for controlling the voltage of said motor, resistance means connected with said field winding for controlling its excitation, operator-controlled means for controlling said resistance means in order to adjust the torque condition of said motor, contact means connected with said resistance means for changing said excitation by an amount corresponding substantially to the frictional loss of the winch drive, and control means connected with said contact means for causing it to increase the resistance value of said resistance means for lowering the torque of said motor when said drum is caused to pay out and to decrease said resistance value for increasing said torque when heaving in, thereby eliminating substantially the disturbing effect of said frictional loss on the operation of the drive.

6. A variable voltage control system for a towing winch, comprising a winch motor, a generator having an armature connected with said motor and a field winding for controlling the voltage generated by said armature, rheostat means connected with said field winding for controlling its excitation, operator-actuable control means for setting said rheostat means in order to thereby adjust said generator for selected towing conditions of said motor, and operator-actuable contact means connected with said field winding and rheostat means for adjusting said generator for high speed operation of said motor independent of the setting of said rheostat means selected by said control means.

7. A variable voltage control system for a towing winch, comprising a winch motor, a generator having an armature connected with said motor and a field winding for controlling the voltage of said armature, rheostat means connected with said field winding for controlling its excitation, operator-actuable control means for setting said rheostat means in order to thereby adjust said generator for selected torque conditions of the towing operation of said motor, operation adjustable second rheostat means disposed for selecting a desired reeling out speed of said motor, operator actuable control means for energizing said field winding through said second rheostat means in order to cause said motor to run in the paying out direction in accordance with the selected setting of said second rheostat means, and interlock means associated with said first and second control means and said first and second rheostat means so that only one of said rheostat means is operative at a time.

8. A variable voltage control system for a towing winch, comprising a winch motor for controlling the paying out of rope, a generator disposed for energizing said motor and having a field winding, rheostat means connected with said field winding for controlling its excitation, a reversible auxiliary motor for adjusting said rheostat means, contact means connected to said auxiliary motor for controlling it to run in either direction in order to raise and lower respectively the torque of said winch motor during the towing operation of the latter, and limit responsive control means also connected with said motor for causing it to run in the reverse direction relative to the direction selected by said contact means, when the length of paid out rope departs from a desired range whereby said length is automatically returned to within said range.

9. A variable voltage control system for a towing winch, comprising a winch motor, a generator disposed for energizing said motor and having a field winding, rheostat means connected with said field winding for controlling its excitation, a reversible auxiliary motor for adjusting said rheostat means, contact means connected to said auxiliary motor for controlling it to run in either direction in order to raise and lower respectively the torque of said winch motor during the operation of the latter, and limit switch means interposed between said auxiliary motor and said contact means so as to prevent operation of said auxiliary motor in one direction when said winch motor exceeds a desired limit of travel in said one direction.

10. A variable voltage control system for a towing winch, comprising a winch drum for accommodating a towing rope, a winch motor in mutual driving connection with said drum, a generator disposed for energizing said motor and having a field winding, rheostat means connected with said field winding for controlling its excitation, a reversible auxiliary motor for adjusting said rheostat means, contact means connected to said auxiliary motor for controlling it to run in either direction in order to raise and lower respectively the torque of said winch motor during the operation of the latter, and limit control means connected with said rheostat means for automatically varying said excitation when the condition of the rope departs from given safe limits, whereby said torque is changed in the direction necessary to restore said rope condition to within said limits.

11. A variable voltage control system for a towing winch, comprising a winch drum for accommodating a towing rope, a winch motor in mutual driving connection with said drum, a generator disposed for energizing said motor and having a field winding, rheostat means connected with said field winding for controlling its excitation, a reversible auxiliary motor for adjusting said rheostat means, contact means connected to said auxiliary motor for controlling it to run in either direction in order to raise and lower respectively the torque of said winch motor during the operation of the latter, and limit control means having relay means connected with said rheostat means and limit switch means for controlling said relay means in order to vary said excitation when the condition of the rope departs from given safe limits whereby said torque is changed in the direction necessary to restore said condition to within said limits.

KURT MAHNKE.